United States Patent [19]
Takahata

[11] Patent Number: 4,603,959
[45] Date of Patent: Aug. 5, 1986

[54] PHOTOGRAPHIC INFORMATION GENERATING APPARATUS FOR CAMERA

[75] Inventor: Hisatoshi Takahata, Sakura, Japan

[73] Assignee: Nippon Kogaku K. K., Tokyo, Japan

[21] Appl. No.: 650,854

[22] Filed: Sep. 14, 1984

[30] Foreign Application Priority Data

Sep. 20, 1983 [JP] Japan .......................... 58-145654[U]

[51] Int. Cl.⁴ ............................................ G03B 15/05
[52] U.S. Cl. .................................. 354/420; 354/145.1
[58] Field of Search ............... 354/413, 420, 421, 422, 354/423, 145.1, 129

[56] References Cited

U.S. PATENT DOCUMENTS 4,339,184  7/1982  Bagdis ................................. 354/413

Primary Examiner—Russell E. Adams
Attorney, Agent, or Firm—Shapiro and Shapiro

[57] ABSTRACT

A camera has a photographic information generating apparatus for supplying preset photographic information to an exposure control circuit. A latch circuit is arranged to latch the photographic information during a period in which noise due to synchronization of at least an electronic flash device is generated.

7 Claims, 4 Drawing Figures

PHOTOGRAPHIC INFORMATION GENERATING APPARATUS FOR CAMERA

BACKGROUND OF THE INVENTION

The present invention relates to a photographic information generating apparatus for a camera.

In a recent camera exposure control circuit, a complementary MOS (to be referred to as CMOS hereinafter) digital IC circuit is used which consumes only small amount of power to allow use of batteries and which can operate at a low voltage, and a shutter speed which is manually set at high precision is controlled in accordance with an output from an oscillator including a quartz oscillator.

In such a system, various photographic information is supplied to the CMOS digital IC circuit in the form of digital signals corresponding to the ON/OFF states of a group of switches connected to the input terminals of the CMOS digital IC circuit by a preset dial interlocked with the switches. The photographic information includes information indicating whether the selected mode is the automatic exposure control photographic mode or the manual exposure control photographic mode, and the information indicating the manually set shutter speed when the manual exposure control photographic mode is selected.

In this case, the input terminals of the CMOS digital IC circuit are gates of MOS transistors. Therefore, in order to keep constant potentials at the input terminals connected to the switches which are turned off, these input terminals must be pulled up or pulled down with resistors or the like. However, when the switches connected to the input terminals are ON, the pull-up or pull-down resistors are connected to the positive power source line and the ground line of an electrical shutter control circuit. Therefore, the current consumption of the electrical shutter control circuit is partially attributed to the resistors.

In order to minimize the current consumption of the electrical shutter control circuit, the impedances of the pull-up or pull-down resistors must be increased. However, when the impedances are increased, noise reduction characteristics are degraded. In particular, in a camera, noise which is generated in a synchronizing contact circuit for synchronizing an electronic flash device to the camera is very high. When the input terminals of the CMOS digital input circuit to which switches turned on or off in synchronism with a photographic mode setting dial are connected, are subjected to this noise, the photographic mode is erroneously set to a mode which is different to one set by the dial.

SUMMARY OF THE INVENTION

It is an object of the present invention to provide a photographic information generating apparatus for a camera, which has a simple circuit configuration and which can completely prevent production of noise generated by an electronic flash device or the like.

According to the present invention, in a photographic information generating apparatus for supplying preset photographic information to an exposure control circuit, a latch is arranged to latch the photographic information during a period in which noise due to synchronization of at least an electronic flash device is generated.

DETAILED DESCRIPTION OF THE PREFERRED EMBODIMENT

Figure 1:
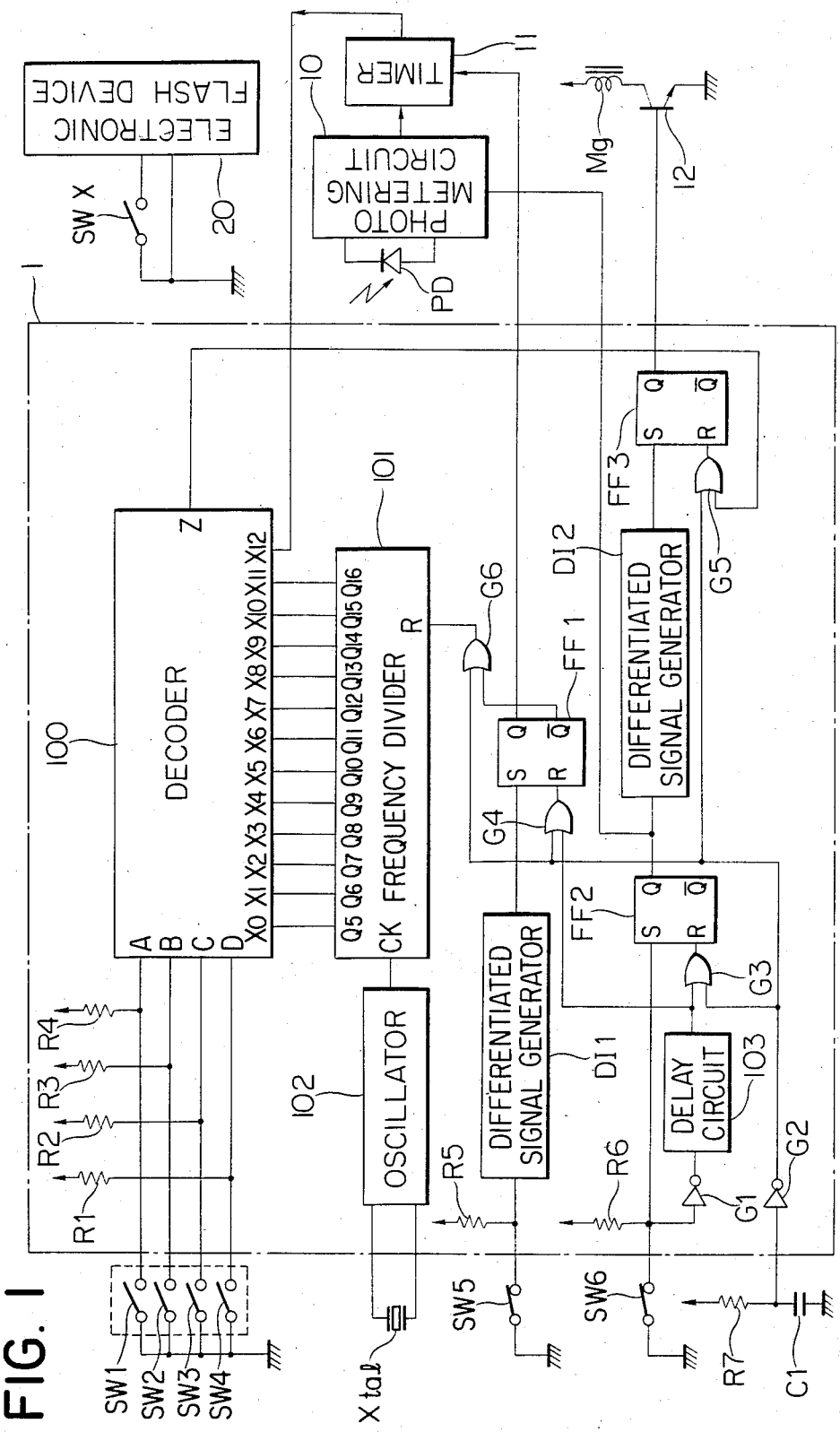
FIG. 1 is a circuit diagram of an electrical shutter control circuit according to the present invention.

FIG. 1 is a circuit diagram of an electrical shutter for a single reflex camera having a focal plane shutter. An erratic operation when a flash device is used will be described in detail with reference to FIG. 1.

A circuit 1 surrounded by the alternate long and short dashed line in FIG. 1 is a 1-chip CMOS digital IC circuit. Photographic mode setting switches SW1 to SW4 are turned on or off in synchronism with a photographic mode setting dial. The switch state in each photographic mode is as shown in the gray code table in Table 1 below.

TABLE 1

| Photographic mode | SW1-SW4 | | | | Selected input appearing at output terminal Z |
|---|---|---|---|---|---|
| | SW1 | SW2 | SW3 | SW4 | |
| Manual exposure | | | | | |
| 1/2000 sec. | L | L | L | L | $X_0$ |
| 1/1000 sec. | H | L | L | L | $X_1$ |
| 1/500 sec. | H | L | L | H | $X_2$ |
| 1/250 sec. | H | L | H | H | $X_3$ |
| 1/125 sec. | H | L | H | L | $X_4$ |
| 1/60 sec. | H | H | H | L | $X_5$ |
| 1/30 sec. | H | H | H | H | $X_6$ |
| 1/15 sec. | H | H | L | H | $X_7$ |
| 1/8 sec. | H | H | L | L | $X_8$ |
| 1/4 sec. | L | H | L | L | $X_9$ |
| 1/2 sec. | L | H | L | H | $X_{10}$ |
| 1 sec. | L | H | H | H | $X_{11}$ |
| Automatic exposure | L | H | H | L | $X_{12}$ |

The photographic mode setting switches SW1 to SW4 are connected to input selection terminals A to D of a decoder 100 which are pulled-up by pull-up resistors R1 to R4. A reference pulse oscillator 102 oscillates at a frequency of 32.768 kHz together with an externally connected quartz oscillator Xtal. The output pulse from the oscillator 102 is supplied to a clock input of a frequency divider 101 comprising 16 frequency-division stages. Outputs Q5 to Q16 of the fifth to sixteenth stages of the frequency divider 101 are connected to input terminals X0 to X11 of the decoder 100. The remaining input terminal X12 of the decoder 100 is connected to the output of a timer circuit 12 constituting an aperture priority or programmed automatic exposure control circuit. The combination of the states of the photographic mode setting switches SW1 to SW4 connected to the input selection terminals A to D of the decoder 100, and the outputs of the signals supplied to the input terminals X0 to X12 to the output terminal Z are also indicated in Table 1 above.

A photo metering circuit 10 including a photodetector PD receives light from an object which is received through a photographic lens and a stop. The photo metering circuit 10 calculates in accordance with an output from the photodetector PD and a signal corresponding to a film sensitivity, and supplies to a timer circuit 11 an output signal corresponding to the exposure time which is determined by the three factors of the brightness of an object, the stop value, and the film sensitivity. The photo metering circuit 10 stores the output signal corresponding to the exposure time when an R-S flip-flop FF2 is set and its Q output goes to "H" level. The timer circuit 11 converts the output signal from the photo metering circuit 10 into an exposure time. When an R-S flip-flop FF1 is set and its Q output goes to "H" level, the timer circuit 11 starts operating the timer. After the time corresponding to the output voltage from the photo metering circuit 10 has elapsed, the output from the timer circuit 11 changes from "L" to "H". A trigger switch SW5 is turned on or off in synchronism with the shutter release operation. The trigger switch SW5 is turned off substantially when the leading or front curtain of the shutter starts running, and is turned on during the winding operation of the film. The trigger switch SW5 is connected to the input terminal of a differentiated signal generator DI1 which is pulled up by a pull-up resistor R5. When the trigger switch SW5 is turned off and the input changes from "L" to "H", the differential signal generator DI1 changes its output from "L" to "H" to set the R-S flip-flop FF1. The $\overline{Q}$ output from the R-S flip-flop FF1 is connected to the reset input of the frequency divider through an OR gate G6. When the $\overline{Q}$ output goes from "H" to "L", the frequency divider 101 is released from the reset state and starts the frequency dividing operation. A mirror switch SW6 is a switch which is turned on or off in accordance with the upward or downward movement of a quick return mirror. The mirror switch SW6 is turned off immediately before the mirror starts moving upward and is turned on again when the mirror completes the downward movement. The mirror switch SW6 is connected to the input terminal of an inverter G1 and the set terminal of the R-S flip-flop FF2 pulled up by a pull-up resistor R6. When the mirror switch SW6 is turned off, the R-S flip-flop FF2 is set, and its Q output changes from "L" to "H". When the mirror switch SW6 is turned off, after a predetermined period of time, the output from a delay circuit 103 goes from "L" to "H" to reset the R-S flip-flops FF2 and FF3 through OR gates G3 and G4. When the R-S flip-flop FF2 is set and its Q output changes from "L" to "H", the output from the differentiated signal generator DI2 is set at "H" for a predetermined period of time to set an R-S flip-flop FF3. The Q output from the R-S flip-flop FF3 is connected to the base terminal of a transistor 12 for driving a magnet Mg for latching or holding a trailing or near curtain. When the Q output of the R-S flip-flop FF3 is "H", the transistor 12 is turned on and the magnet Mg is energized. The reset input of the R-S flip-flop FF3 is connected to the output Z of the decoder 100 through an OR gate G5. When the output Z from a multiplexer MP changes from "L" to "H", the R-S flip-flop FF3 is reset and its Q output becomes "L". Then, the transistor 12 is turned off, and the magnet Mg is deenergized. A resistor R7 and a capacitor C1 constitute together with an inverter G3 a power on reset circuit. For a predetermined period of time from the power on of the electrical shutter control circuit, the output from the inveter G2 is "H". The output from the inverter G2 is connected to the R-S flip-flops FF1 to FF3 and the reset input of the frequency divider 101 through OR gates G3 to G6 so as to reset the R-S flip-flops FF1 to FF4 and the frequency divider 101 immediately after power supply to the electrical shutter circuit.

An X contact SWX is turned on when the shutter is fully opened upon completion of the turning operation of the leading or front curtain of the shutter so as to flash an electronic flash device 20.

The mode of operation of the circuit shown in FIG. 1 will now be described.

When the film winding operation of the camera is performed and the camera is in the standby mode for photography, the trigger switch SW5 and the mirror switch SW6 are ON. When the shutter release button is depressed for taking a photograph, the power source switch (not shown) is turned on at the first stroke, the R-S flip-flops FF1 to FF3 and the frequency divider 101 are reset, and the photometering circuit 10 starts the metering operation. When the shutter release button is depressed further, the locking member of the shutter release mechanism is released, and a known shutter release operation is started. As the first stage of the shutter release operation, the stop-down operation of the photographic lens is started.

When the stop of the photographic lens is closed to a preset stop value, the mirror is moved upward. Immediately before the mirror is moved upward, the mirror switch SW6 is turned off, and the R-S flip-flops FF2 and FF3 are set. Then, the photo metering circuit 10 stores the output signals based on the brightness of the object, the stop value of the lens, and the film sensitivity immediately before the mirror up movement. At the same time, the transistor 12 is turned on, the magnet Mg is energized, and the trailing curtain is held.

When the upward movement of the mirror is completed, the lock mechanism of the leading curtain is released. At the same time, when the trigger switch SW5 is turned off, the running movement of the leading curtain is started. When the trigger switch SW5 is turned off, the R-S flip-flop FF1 is set. Then, the frequency dividing operation of the frequency divider 101 and the timer operation of the timer circuit 11 are started.

When the photographic mode is the automatic exposure photographic mode, after the exposure time corresponding to the stored output voltage from the photo metering circuit 10 has elapsed, the output from the timer circuit 11 changes from "L" to "H". Then, the R-S flip-flop FF3 is reset through the input X12 and the output Z of the decoder 100 and the OR gate G5. If the photographic mode is the manual photographic mode and the shutter speed is set to be, for example, 1/30 sec, when the output Q11 of the 11th stage of the frequency divider 101 changes from "L" to "H", the R-S flip-flop FF3 is reset through the input X6 and the output Z of the decoder 100 and the OR gate G5. When the RS flip-flop FF3 is reset, the transistor 12 is turned off. As a result, the magnet Mg is deenergized, and the running operation of the trailing curtain is started. After the running operation of the trailing curtain is completed, the down movement of the mirror is started. When the down movement of the mirror is completed, the mirror switch SW6 is turned on again and the R-S flip-flops FF1 and FF2 and the frequency divider 101 are reset for the next photographic operation.

The above is the general photography operation. However, an erratic operation when the electronic flash device 20 is used will be described with reference to FIGS. 2 and 3.

Figure 2:
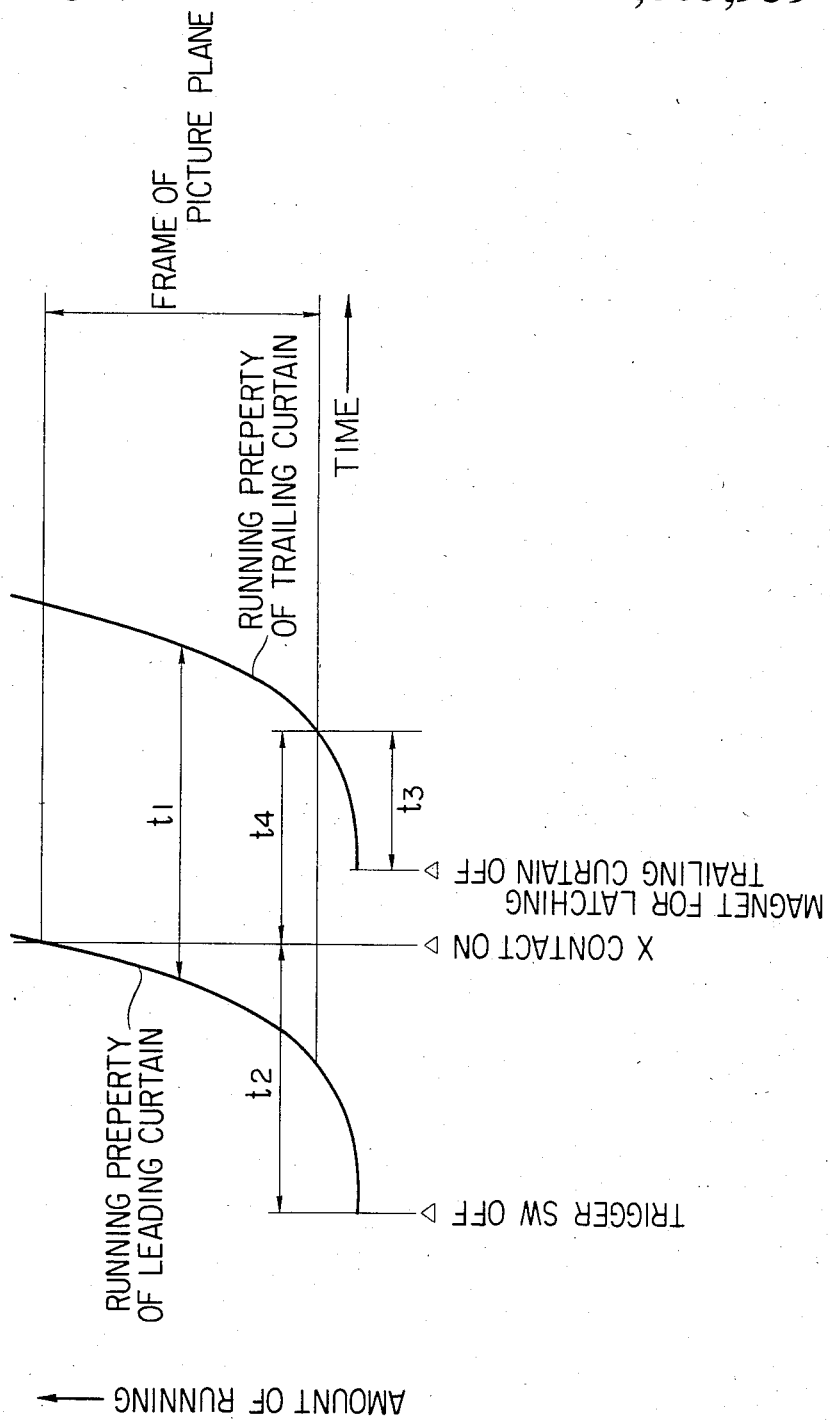
FIG. 2 is a graph showing shutter running curves.

FIG. 2 is a graph showing the running curves of the curtains and the timing of the X contact SWX as a synchronization contact of the electronic flash device 20.

As shown in FIG. 2, when the trigger switch SW5 is turned off, the leading curtain of the shutter starts running. When the leading curtain completes running the frame of the picture plane, that is, after t2 from the turn off of the trigger switch SW5, the X contact SWX is turned on.

The trailing curtain of the shutter starts running when the magnet Mg is deenergized after the shutter time t1 from the turn off of the trigger switch SW5. The trailing curtain starts covering the frame in t3 after the start of the running operation.

In the photographic mode using the electronic flash device, the full open time t4 of the shutter must be longer than the ON time of the electronic flash device and t4 must generally be longer than 1 ms. Therefore, t2 and t3 are determined by an optimal synchronizable shutter time with the electronic flash device. In a shutter having an optimal synchronizable shutter time of 1/250 sec, t2 is about 6.5 ms and t3 is about 3.5 ms.

Figure 3:
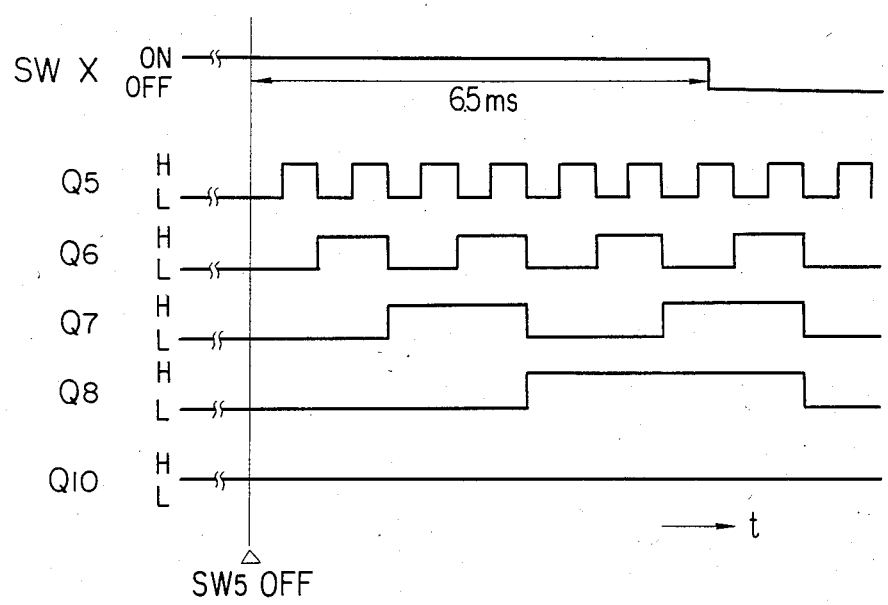
FIG. 3 is a timing chart showing the relationship between the divided stage outputs and an X contact.

FIG. 3 is a timing chart showing the relationship between the trigger switch SW5, the X contact, and the frequency-division stage outputs Q5 to Q8 and Q10 of the frequency divider.

Assume that the photographic operation is started using the electronic flash device in the manual photographic mode of 1/30 sec, and the trigger switch SW5 is turned off when the leading curtain starts running. Then, as shown in FIG. 4, a frequency divided output of 32.768 kHz is obtained at the frequency-division output stage of the frequency divider.

After 6.5 ms from the turn off of the trigger switch SW5, the X contact SWX is turned on. Assume that all the input selection terminals A to D of the decoder 100 having high impedances due to the off state of the photographic mode switch connected thereto are instantaneously drifted to the ground voltage level due to the noise generated immediately after the X contact SWX is generated. Then, as may be seen from Table 1, during the drift time, the output Z of the decoder 100 produces not the frequency-division stage output S11 but Q5. At this time, as shown in FIG. 3, since the output Q5 is "H", the R-S flip-flop FF3 is reset, the magnet Mg is deenergized, and the shutter is closed. When only the inputs B and C among the input selection terminals A to D of the decoder 100 are drifted to the ground level by the noise, the output Z of the decoder 100 produces the frequency-division stage output Q7. Since the output Q7 is also "H", a similar erratic operation is caused. When only the inputs A and D among the input selection inputs A to D of the decoder 100 are drifted to the ground voltage level by the noise, the output Z of the decoder 100 produces the output from the timer circuit 11. A similar erratic operation also occurs when the timer circuit output is "H" in the synchronized photography during the day time.

A latch circuit for preventing the above-mentioned erratic operation according to the present invention will be described with reference to FIG. 4. The circuit in FIG. 4 has, in addition to the circuit components shown in FIG. 1, D flip-flops FF5 to FF8, an R-S flip-flop FF4, an AND gate G7, and an OR gate G8 constituting the latch circuit.

Figure 4:
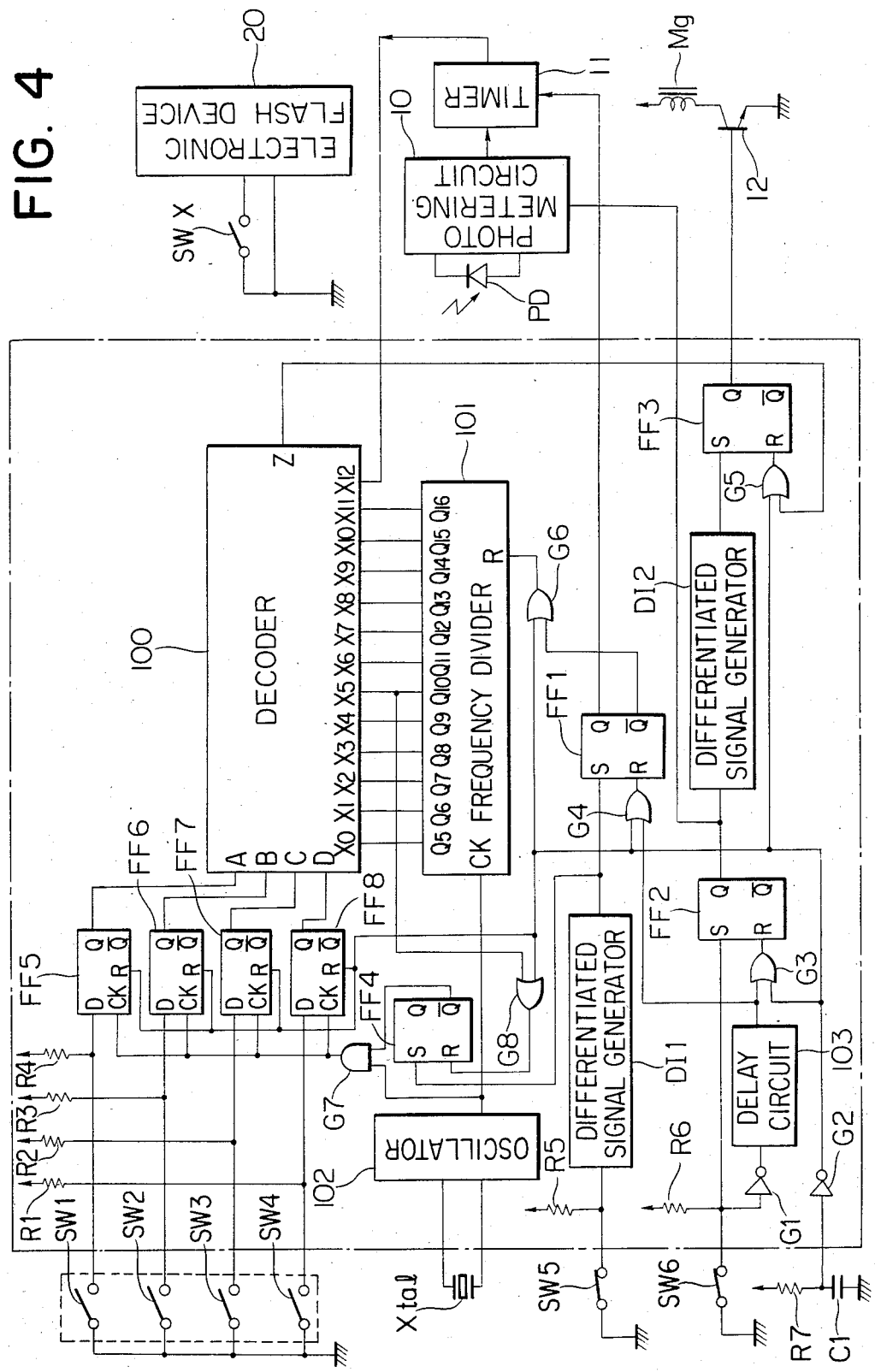
FIG. 4 is a block diagram of an embodiment of the present invention.

Referring to FIG. 4, the gate inputs to the D flip-flops FF5 to FF8 are pulled up by pull-up resistors R1 to R4 and are respectively connected to photographic mode setting switches SW1 to SW4. The Q outputs from the D flip-flop FF5 to FF8 are connected to input selection terminals A to D of a decoder 100. During the data updating operation, the state of the photographic mode setting switch is transmitted to the input selection terminals of the decoder 100.

One input terminal of the AND gate G7 is connected to the output of an oscillator 102, and the other input terminal thereof is connected to the $\bar{Q}$ output of the R-S flip-flop FF4. When the R-S flip-flop FF4 is reset, the output from the oscillator 102 is supplied to the clock input terminals of the D flip-flops FF5 to FF8 through the AND gate G7, and the D flip-flops FF5 to FF8 perform the data updating operation.

One input terminal of the OR gate G8 is connected to the output of the inverter G2, and the other input terminal thereof is connected to the frequency-division stage output Q10 of the frequency division output. The output of the OR gate G8 is connected to the reset input of the R-S flip-flop FF4. The set input of the R-S flip-flop FF4 is connected to the output of a differentiated signal generator DI1.

Assume that the photography operation is started using an electronic flash device in the manual photographic mode of 1/30 sec. When the shutter release button is depressed and the power source switch (not shown) is turned on at the first stroke of the button, the R-S flip-flops FF1 to FF4, the D flip-flops FF5 to FF8 and a frequency divider 101 are reset. When the reset states of the D flip-flops FF5 to FF8 are released upon power on, the states of the photographic mode setting switches SW1 to SW4 are transmitted to the input selection terminals A to D of the decoder 100. Then, in the same manner as in FIG. 1, the photographic operation is performed. The latching mechanism of the leading curtain is released, the trigger switch SW5 is turned off, and the output from the differentiated signal generator DI1 goes to "H" level. Then, the R-S flip-flop FF4 is set, and its $\bar{Q}$ output goes to "L" level. As a result, the AND gate G7 stops the supply of clock pulses to the D flip-flops FF5 to FF8, and the input selection terminals of the decoder 100 are set in the manual photographic mode of 1/30 sec. The clock pulses are supplied to the D flip-flops FF 5 to FF8 when the frequency-division stage output Q10 goes to "H" level and the R-S flip-flop FF4 is reset, that is, after 1/64 sec. since the trigger switch SW5 is turned off. Therefore, as in the case of FIG. 1, within 6.5 ms from the turn off of the trigger switch SW5, the X contact SWX is turned on. Then, even if the D flip-flops SW1 to SW4, to which the photographic mode setting switches SW1 to SW4 are connected, are drifted by noise to the ground voltage level, the input selection terminals A to D of the decoder 100 are held in the manual 1/30 sec. state during the data hold period. Since the noise period accompanied by the turning on of the X contact SWX is several hundred microseconds, the erratic operation as described with reference to FIG. 1 will not be caused by the noise.

According to the photographic mode information generating apparatus of the present invention, since the photographic mode information is latched, the contents of the preset photographic mode information may not be inadvertently changed to another mode by the influence of the noise generated by turning on of the electronic flash device.

Since latching of the information is performed only during the noise generating period, the photographic mode can be changed at any other times. For example, when the aperture priority automatic exposure control mode is set and the shutter release button is depressed without removing a lens cap, the shutter is kept open. However, if the mode is changed to a mode for obtaining a specific shutter speed, the shutter can be closed.

What is claimed is:

1. A camera which initiates exposure by driving of a shutter, comprising:
    (a) timer means for counting plural times respectively in response to driving of the shutter, the timer means generating an output signal each time the respective times are counted;
    (b) setting means for setting exposure information for controlling a shutter speed and for generating an output signal corresponding to the exposure information;
    (c) control means for controlling shutter speed in accordance with output signal from said timer means and output signal from said setting means;
    (d) latch means for latching the output signal from said setting means in response to the driving of said shutter, said control means controlling said shutter in accordance with latched output signal; and
    (e) releasing means for releasing a latching operation of the output signal from said setting means by said latch means, in response to output signal from said timer means at a time when said timer means counts a predetermined time of said plural times.

2. A camera according to claim 1, wherein said control means controls said shutter in accordance with an output signal generated by said timer means when said timer means counts one of said plural times which corresponds to exposure information set by said setting means.

3. A camera according to claim 1, wherein said setting means has an operation member operated manually to set a shutter speed.

4. A camera according to claim 1, wherein said timer means has plural output terminals, a signal being generated through any one of said plural terminals each time any one of said plural times is counted by said timer means, and said releasing means is connected to one of said plural output terminals.

5. A camera according to claim 1, further including light intensity detecting means for detecting a light intensity from the object and for generating a light intensity signal representing the detected light intensity; and said control means controls said shutter in accordance with the light intensity signal and the latched output signal.

6. A camera having a control apparatus for starting an exposure by the driving of a shutter and for synchronizing a flash device for emitting flash light toward an object an an operation of said shutter, including:
    (a) timer means for counting respectively plural times in response to the driving of the shutter, said timer means counting a predetermined time of said plural times and generating an output signal;
    (b) setting means for setting exposure information for controlling a shutter speed and for generating an output signal corresponding to the exposure information;
    (c) means for starting a flashing operation of the flash device;
    (d) latch means for latching the output from said setting means prior to the flashing operation of said flash device;
    (e) said control apparatus being associated with said timer means and controlling said shutter in accordance with output signal from said setting means latched by said latch means; and
    (f) releasing means for releasing a latching operation of the output signal from said setting means by said latch means in response to the output signal of said timer means.

7. A camera according to claim 6, wherein said timer means generates output signal each time the respective plural times are counted, and said control apparatus controls the shutter in accordance with the output signal from said timer means.

* * * * *